No. 687,512. Patented Nov. 26, 1901.
B. BARKER & B. J. SPINK.
CUTTER BAR AND EXPANDING CUTTER.
(Application filed Sept. 9, 1901.)

(No Model.)

WITNESSES:
Isabella Waldron
Adelaide Claire Gleason

INVENTORS
Benjamin Barker
Bernard Joseph Spink
BY Richards & Co
ATTORNEYS

UNITED STATES PATENT OFFICE.

BENJAMIN BARKER AND BERNARD JOSEPH SPINK, OF BRADFORD, ENGLAND.

CUTTER-BAR AND EXPANDING CUTTER.

SPECIFICATION forming part of Letters Patent No. 687,512, dated November 26, 1901.

Application filed September 9, 1901. Serial No. 74,790. (No model.)

*To all whom it may concern:*

Be it known that we, BENJAMIN BARKER and BERNARD JOSEPH SPINK, subjects of the King of Great Britain and Ireland, whose postal address is St. James Iron Works, Diamond street, Bradford, in the county of York, England, have invented certain new and useful Improvements in and Relating to Cutter-Bars and Expanding Cutters, (for which application for a patent has been made in Great Britain, numbered 15,244, dated July 27, 1901,) of which the following is a specification.

This invention has for its object the construction of adjustable cutters in combination with cutter-bars suitable for boring iron and like metals, so arranged that the cutters may be expanded or contracted, that holes of various diameters may be bored with the same boring or cutter bar and cutters mounted thereto, and to effectually secure the cutters in the desired position for boring the hole to the diameter required.

In describing our invention in detail reference is made to the accompanying sheet of drawings, in which—

Figure 1:
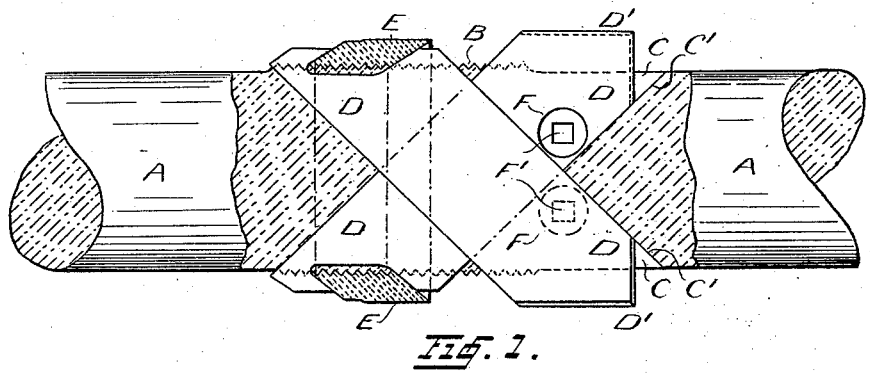
Figure 2:
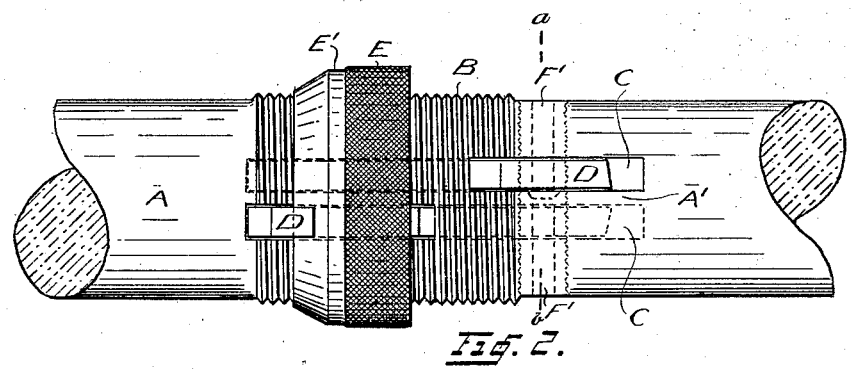
Figure 3:
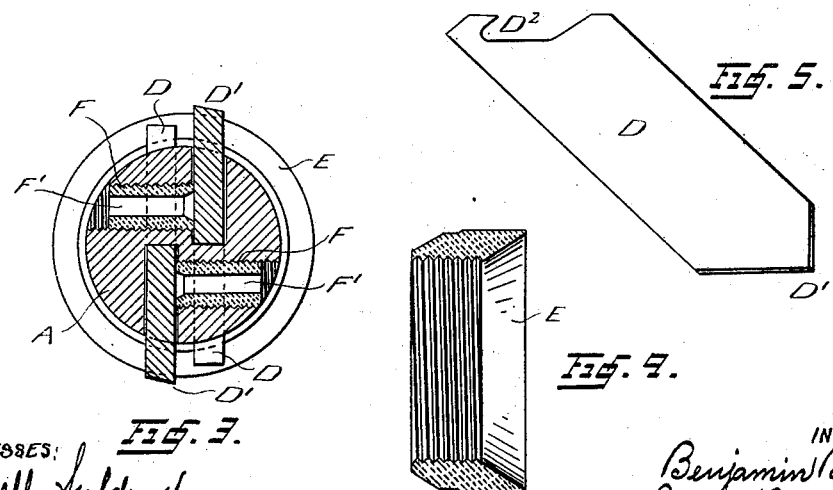
Figure 4:
Figure 5:
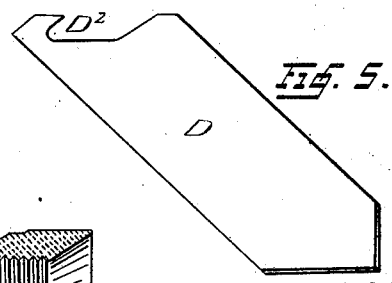

Figure 1 represents an elevation of a boring or cutter bar with cutters mounted therein in accordance with our invention. The division-piece of metal between the slots forming the cutter-beds is removed for more clearly showing the angle of the slots and cutters therein. Fig. 2 is an elevation of the boring or cutter bar, showing same at right angles to Fig. 1. Fig. 3 is a transverse section through line $a\,b$ of Fig. 2. Fig. 4 is a sectional elevation of the cutter-adjusting nut, and Fig. 5 an elevation of one of the cutters detached from the boring or cutter bar.

The boring or cutter bar A is mounted in a boring-machine and operated in the usual manner. A screwed thread B is cut on the circumference of the said bar for a portion of its length, and through the boring or cutter bar two cutter-holes C C are formed at a suitable angle to the axis of the said bar. (Clearly shown by Fig. 1.) A cutter D is placed within each slot C. One end of each cutter at D' is formed in the ordinary manner for cutting metal. The other end of each is provided with an angular recess $D^2$. Each angular recess engages with a nut E in the manner as shown by Fig. 1, by which it will be clearly seen that by the cutters D filling the respective slots C and by the recesses $D^2$ engaging with the concave and convex ended nut E on the rotation of the said nut in one direction the cutters D are propelled up the inclined surfaces C' of the slots C, causing the cutting ends at D' to expand and travel away from the center of the boring or cutter bar A, or when the nut is rotated in the opposite direction the cutters D are caused to travel down the inclined surfaces C', and thereby withdraw the cutting edges D' toward the boring-bar A. Thus by these means the cutting edges D' of the cutters may be adjusted to bore holes of different diameters, the cutters D being further held or locked in the desired position by socketed screws F, arranged so that on tightening the screws on inserting a lever in the respective square holes F' the cutters D are held tight against the division-web A'.

As the result of experiments we find that the best angle to be given to the slots C is the angle shown on the drawings, though slight alterations in the angle may be made and our object to some extent accomplished.

It will be obvious that by graduating the circumference of the nut at E' the distance apart of the cutting edges D'—that is to say, the diameter of the hole to be bored—may be readily obtained on moving the nut until the desired graduation is at some fixed point, such as to one edge of one of the cutters D, and there locking the cutters in the position at which they are "set."

What we claim as our invention is—

A cutter-bar A comprising as essential elements slots C cut at an inclined angle for the reception of cutters D, supported by a nut E and secured by socketed screws F constructed and operated as hereinbefore described.

In witness whereof we have hereunto set our hands in the presence of two witnesses.

BENJAMIN BARKER.
BERNARD JOSEPH SPINK.

Witnesses:
LEWIS WAUGH,
JOSEPH P. KIRBY.